United States Patent

[11] 3,592,427

| [72] | Inventor | Louis J. Misuraca<br>1359 Romulus Drive, Glendale, Calif. 91205 |
|---|---|---|
| [21] | Appl. No. | 790,039 |
| [22] | Filed | Jan. 9, 1969 |
| [45] | Patented | July 13, 1971 |

[54] ADAPTABLE MODULE, CONDUIT AND TUBE SUPPORT
8 Claims, 5 Drawing Figs.

[52] U.S. Cl. .............................................. 248/68
[51] Int. Cl. .............................................. F16l 3/22
[50] Field of Search ..................................... 248/68, 68
 CB; 174/157; 24/125; 72/53

[56] References Cited
UNITED STATES PATENTS

| 1,133,976 | 3/1915 | Kraus | 248/68 |
| 2,077,639 | 4/1937 | Minich | 72/53 |
| 2,417,260 | 3/1947 | Morehouse | 248/68 X |
| 3,216,683 | 11/1965 | Girard | 248/68 |
| 3,397,431 | 7/1968 | Walker | 248/68 X |

Primary Examiner—Chancellor E. Harris
Attorney—Edwin E. Greigg

ABSTRACT: The invention consists primarily of an adaptable module, conduit and tube support system which, in turn, provides the foundation for the many conduits, tubes and other carriers employed in the distribution of gases, fluids, semisolids or other media as may need to be transported under various pressures and temperatures; to provide such support in efficient, workmanlike manner by utilizing structure of minimum weight and high strength ratio in the form of basically channel-shaped modules employing conduit straddling yoke portions; the same being securely retained and aligned in fixed locating rails and substantially immobilized therein by appropriate fastening elements.

INVENTOR
LOUIS J. MISURACA

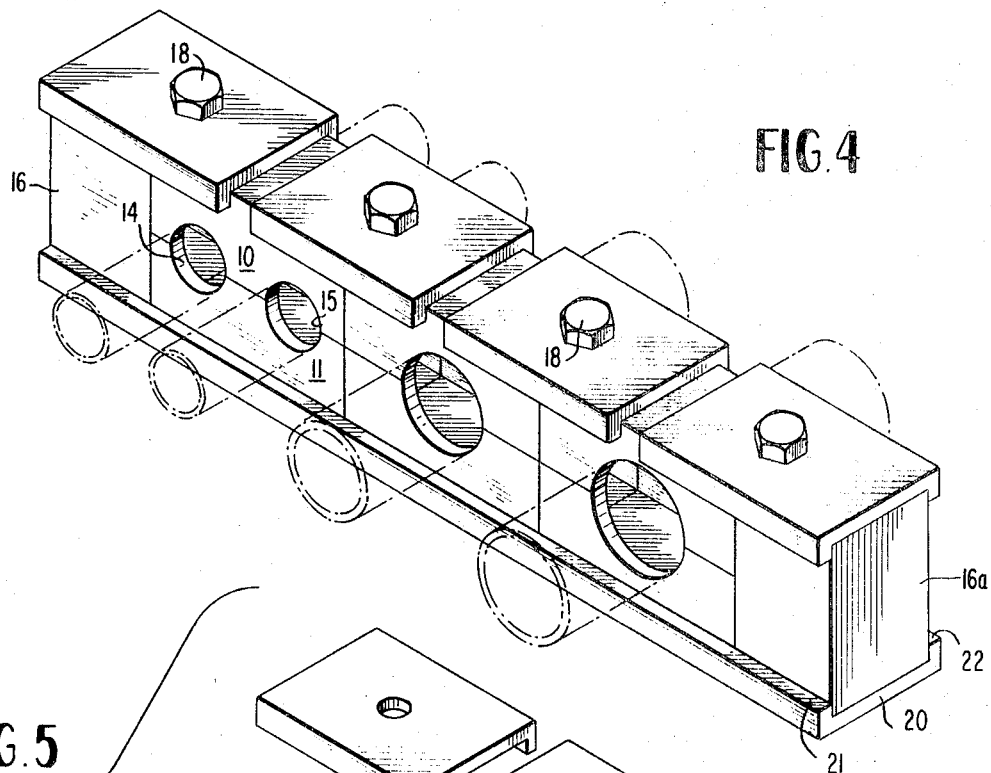
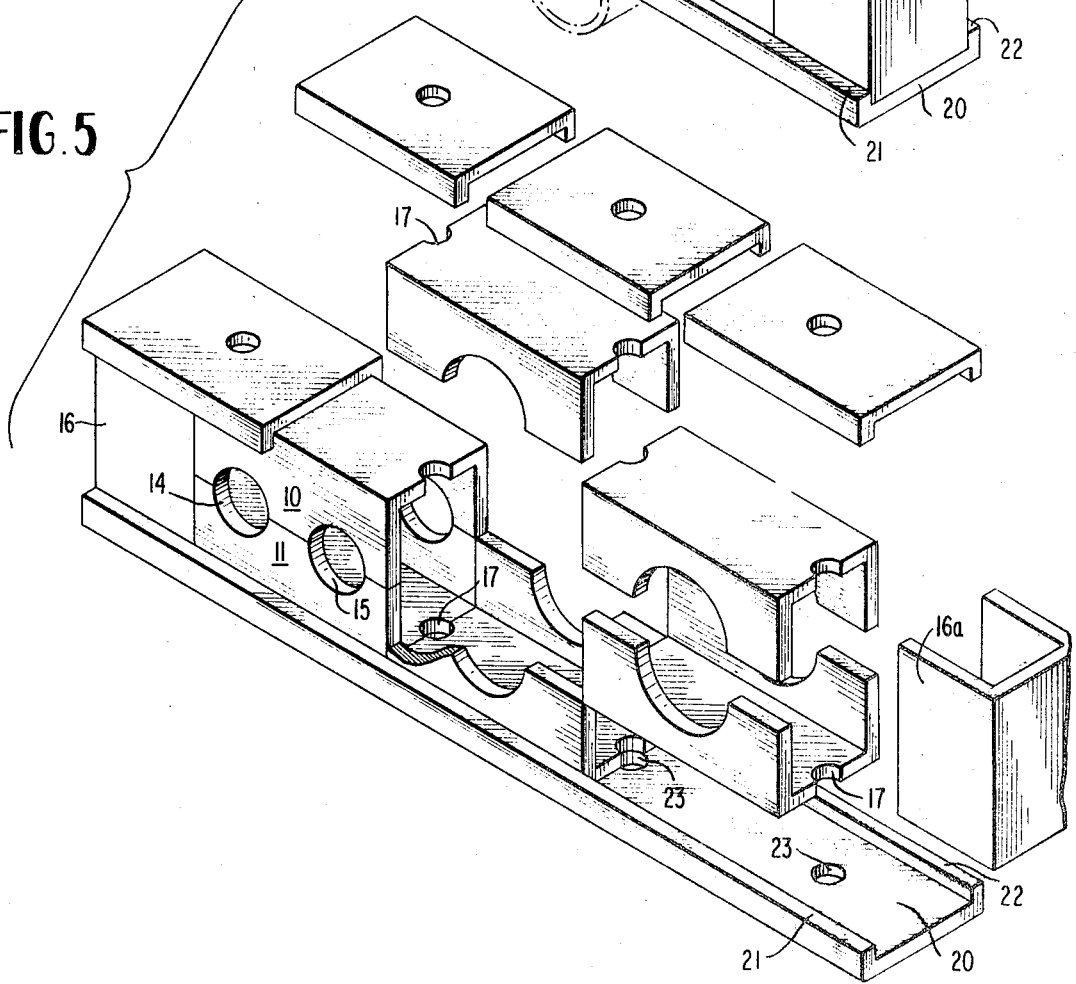

ADAPTABLE MODULE, CONDUIT AND TUBE SUPPORT

This invention resides in the provision of a simplified module, conduit and tube support system possessing high strength-to-weight ratio. It is also amenable to rapid replacement and/or servicing requirements because of increased accessibility of the modular configuration employed. In addition, a highly efficient, low unit cost method of manufacture is provided.

Heretofore, conduit and tube supports used for the routing and sustaining of lines for the transport of all kinds and types of media have almost invariably been based on use of solid bodies, usually voidless castings having poor strength-to-weight ratios, as well as high unit cost. Devices of this general type are usually referred to as "blocks" in the trade, and have found wide distribution in many industries such as petroleum, chemical, paper, plastics and canning plants. In the aircraft industry, and for aerospace vehicle use, many of the former devices in this art are no longer acceptable to the stringent and high stress requirements imposed by late developments in these fields.

A typical and exceedingly important need which has yet to be met in a positive and fail-safe manner in the stated fields (and others) by present devices, one which, of necessity, commands the highest priority in the minds of all interested parties, is the so-called "bonding" characteristic, namely, the maintenance of complete and permanent electrical potential balance between the metal frame (substrate) of an aircraft or space vehicle and the separate, individual (discrete) components attached thereto, such as, for example, fuel and hydraulic lines, etc., in other words the establishment and maintenance of complete electrical ground potential throughout all stated elements in as nearly a perfect state as can be achieved and fixed. While natural electrical forces may, at times, at least partially or momentarily upset this balance, the more positive the electrical ground connection between all elements, the less the hazard involved, both in regards to possible arcing, or interference with radio communications.

In former devices of the nature described, quite often grounding of discrete components and substrate needs to be done by make-do, added thin foil strips or parts and the like, especially in those instances when tubes or carriers are mounted in resilient (rubber) mountings at areas of resonantly imposed vibrations, etc.

In this invention, these stopgap methods are avoided entirely, first, by providing two narrow (annular), high pressure, positive and long-lasting contacts between each module and conduit, and second, in the case where resilient mounting is desired, by providing highly conductive (impregnated) fluorosilicone rubber mounting bushings in standard tube, split sizes and of proper durometer (of resiliency), the last being of many years effectiveness even in highly polluted atmospheres as prevalent today.

Accordingly, one of the principal objects of the invention is the provision of a conduit or tube support for any array of tubes or carriers in which superposable complemental hollow channel-shaped modules, each of which has at least one pair of diametrically opposed tube straddling yoke portions pierced through integral walls, the same being provided with longitudinally extending rows of perforations coincident with similar perforations which are severed from the end portions of the channel bottom wall and complemental to those provided in an adjacent module so as to facilitate conjoining of said modules in abutting relation.

Another object of the invention in the assembly of discrete modules to aggregate a complete and workmanlike structure is the employment of further (identically shaped) channel members of proper width and length so as to be capable of close and precise conjoining with the modular conduit or tube supporting means, either in elongated strip form or in predicated, determinate lengths, as required to assemble specific arrays into unitary composites.

A still further object of the invention is to provide a system of unitizing the modular conduit supporting members so that they will position and securely anchor, in exact array, the rows of aligned tubes or carriers, usually, although not inflexibly, in parallel relationship.

Yet another object of the invention is to provide an improved method, in semiautomated form, for the rapid and low cost fabrication of the modular components comprising this conduit support system. Concomitant with this objective is the utilization of high strength, lightweight, precisely accurate metal sections for the basic materials, usually in extruded or specially rolled lengths of 20 feet or more and ordinarily of heat-treated aluminum stock, such as, for example, 2024–T3 basic alloy. In some instances, as in aerospace use, the raw stock may even be of continuously cast (process) titanium alloys or other rare earth, sophisticated, new, low specific gravity alloys of very high strength and corrosion resistance. Ordinarily, however, the less costly basic materials will more than suffice.

A further object of the invention is the ease with which particular modules may be fabricated to carry a plurality of small conduits or tubes, either all of one size or of parallel pairs perhaps. This contrasts importantly with present devices of this art, usually comprised of heavy die-castings and limited to one, space wasting tube size. Concomitantly with the above provision, it is pointed out that the new, rapid system of manufacture includes expeditiously changed modular punch and die stations with rapidly exchangeable tooling; thus a rush order for special arrangements and sizes could be setup and fabrication begun in a matter of 1 or 2 hours or less. Relative improvement over present methods appears to be obvious.

Still another object of this invention is that all elements of this modular conduit support system, including alignment rails, alignment blocks, modular yoke parts, end closure blocks, and other parts as may be processed from the raw stocks, as will be described hereinafter, with the possible exception of the zinc-plated, high tensile bolts, nuts, lock washers, etc., used for assembly, are intended to be subjected to a final processing procedure in a "closed" system device or machine, either completely automatic or partly manual when only a few pieces are involved. This final treatment or finishing will take place only after all cutting, piercing, shaving, slitting, sawing, threading, punching, stamping and other fabrication operations are entirely complete, including the piercing and shaving or all openings which will receive and support the conduits or tubes of the installation, and will consist of fine glass or other "shot peening" of the entire (inside and outside) surfaces of completed parts, the object being to impart, first, a uniform, attractive, distinctive overall "satin" finish of equal appearance from all angles, second, to very minutely radius all sharp edges, third, to enhance the structural strength of all parts through compressed skin tension, and, lastly, to esthetically increase the uniform beauty and finished appearance of the completed installation.

Other objects and advantages will become apparent from the following description taken in conjunction with the accompanying drawings, in which:

FIG. 4 is a perspective view of a very short run of adaptable module, conduit and tube support assembly with a typical random array of conduits shown in phantom lines; and FIG. 5 is an exploded view of the elements comprising the abbreviated array illustrated in FIG. 4.

Figure 1:
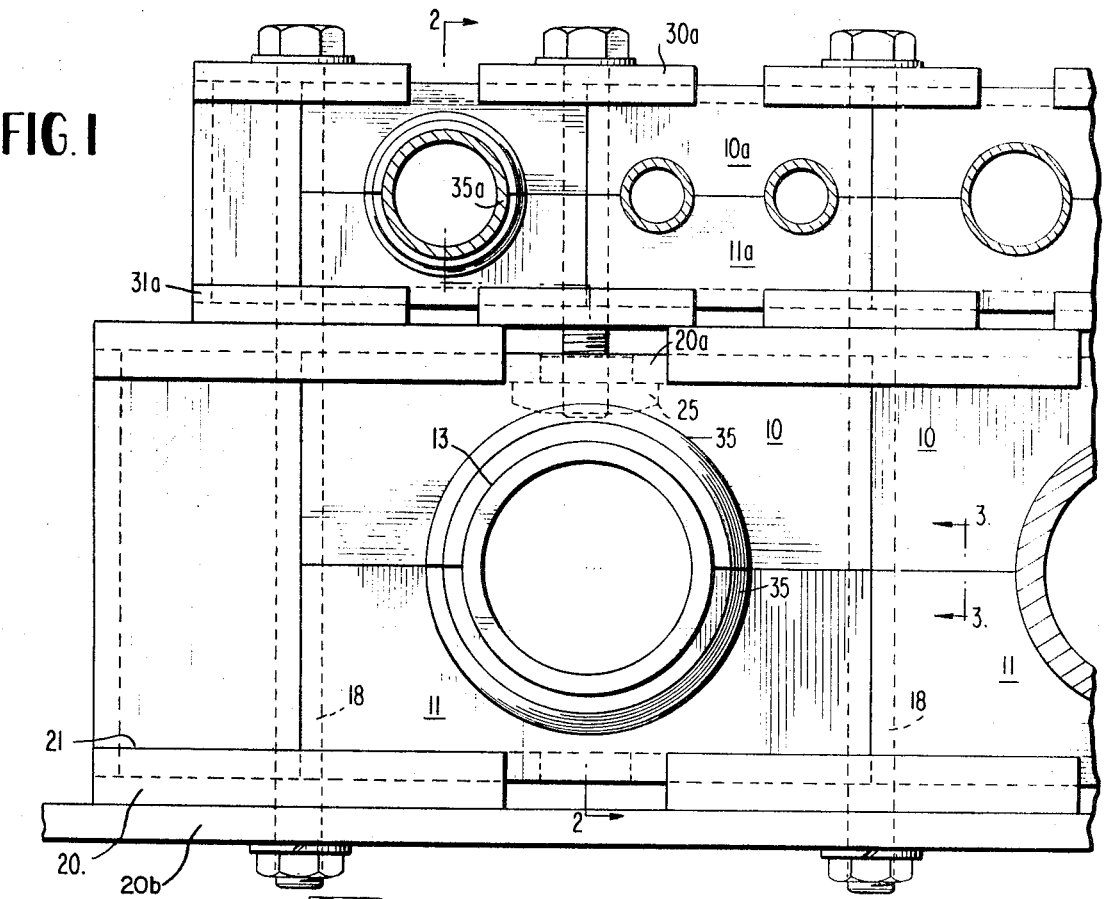
FIG. 1 is a front elevational view of a modular conduit support showing the modules assembled in tiers or stacked formation. It is, of course, contemplated that while two tiers are shown, larger modules in progression may be sublet below as may be required.
Figure 2:
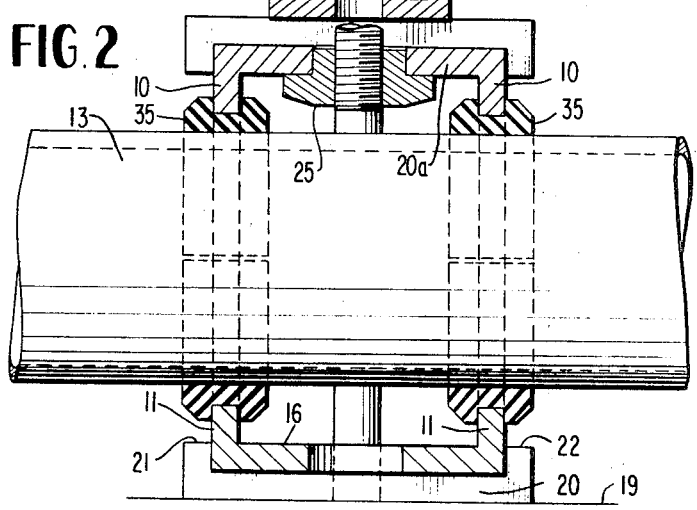
FIG. 2 is a partial side cross-sectional view and part side elevational view of typical end modules of the system taken on line 2-2 of FIG. 1.

Turning now to FIG. 1 there is shown generally in front elevation a typical short span of my improved adaptable module, conduit and tube support system which comprises a plurality of superposable complemental modules 10 and 11 which in any given module pair are absolutely identical, one to the other and may by choice or happenstance be either placed in the upper or lower position at random, the general configuration of these being further disclosed in FIG. 2. In the left end module are also illustrated a medium size pair of conduits 12 and 13 (only one shown) which are supported and tightly gripped in the identical aligned yoke halves 14 and 15 as also illustrated (in slightly altered surroundings) in FIG. 4. It should be pointed out that in these smaller modules (and in any others for that matter) any reasonable number of small tubes, for example, eight round tubes of 0.125 inch diameter, or two 0.250 tubes and two 0.375 conduits, or two 0.3125 and one 0.500 diameter tubes, are readily provided. Square tubes, round tubes, rectangular tubes or odd shaped conduits of most any shape could easily be provided for in short order and at reasonable cost, so that customer specifications could be accommodated in almost any combination of size and orientation within module capacity.

It will be noted that whereas the "blocks," typical of earlier conduit supports, were usually made of solid, cast materials, a goodly part of which contributed little more than excess weight to the usual installation, the adaptable modular supports described herein are substantially of U-shaped, channel sections of extra strength, dense, heat-treated material which, when rigidly locked up by proper (high tensile) fasteners on an appropriate base angle or other suitable foundation, form what in structural engineering are termed "rigid frames" of rectangular, vertical orientation, resulting in a very strong and efficient system. All the channel sections have, of course, integral base walls 16 from which the parallel, yoke bearing walls offstand.

The bottom walls of all modules are perforated or pierced longitudinally thereof with a row of precisely spaced, ovoid-shaped holes with which the subsequent tube support openings (in both their piercing and shaving operations) are precisely coordinated so that in conjoining any given yoke halves, they provide medially disposed, exactly sized circular or other shaped openings to grip with predetermined pressure and at diametrically opposite sides the tube or conduit to be supported. The ovoid-shaped openings, when accurately severed (for cutting the modules to exact length), serve to provide two exactly aligned, semicircular holes 17 which, when modules are abutted together in assembly, form circular openings 23 for the high tensile bolts 18 used as fasteners.

Those skilled in the art and who are familiar with the use of "blocks" for the purpose referred to earlier realize that all of the "blocks" presently known and which are available, especially those which are cast, are designed to mount but one or, at best, two conduits. Thus, if more conduits need to be supported in a given area, particularly in confined quarters where, for example, it is required that four hydraulic lines or tube of about 0.250 inch O.D., two outgoing, and two incoming, need to be installed, considerable difficulties are presently experienced entailing special labor and cost additions, together with a redundance of supports because, apparently, no one has had the foresight to anticipate situations of this kind and provide a simplified, adaptable, modular conduit support such as proposed. Circumstances of this kind are especially prevalent in the aircraft and aerospace industries, the latter, in particular, where every added ounce of excess weight extracts astronomical penalties.

At 19 there is shown a base or support member for the modular conduit support elements which could be termed typical of various surface areas integral or offstanding from the substrate structure of an aircraft or aerospace vehicle to which the modules will be attached as now to be described.

An elongated metal restrictive guide or alignment rail 20 of predetermined length, which includes integral offstanding parallel confinement rims 21 and 22, is perforated at exactly spaced increments thereof with cylindrical apertures as shown at 23, the space between any given pair of pierced holes being precisely adequate to accept a pair of modular yokes therebetween. The half-cylinder openings 17 provided in each end thereof coincide closely with the aperture 23 of the alignment or base rail 20. Thus, as mentioned hereinbefore, when a grouping of modules are inserted on the rail 20, their abutting ends produce, at fixed intervals, apertures through which a typical fastener 18 is installed. It should be mentioned that the base rail 20 (properly clamped and located on the substrate or support surface) has been found to be an excellent guide to spot center appropriate hole locations in the support media for drilling after removal thereof. As shown in FIG. 1, the module support with the tubes is attached to a substructure 20b in the form of a plate or the like having apertures for fasteners 18 provided therein.

It is notable that this adaptable modular conduit support system lends itself well to stacking or tiering in a logical manner, namely, with the largest modules and tubes in the base strata, and progressing outwardly as the requirements dictate. A stronger, pyramidal base thus ensues naturally as a consequence.

Referring at this time to FIGS. 1 and 2, a simple illustration of the above-noted stacking adaptability is demonstrated, the second tier of modules 10a and 11a being shown as superimposed upon the first set of modular supports and secured thereto in a manner now to be described.

In most instances the upper tiers of modules, such as 10a and 11a, will carry the smaller groupings of supported conduits inasmuch as modules in the upper levels become progressively smaller in overall capacity. However, this is not necessarily a fixed premise and in many cases (based on convenience or preferability) may be disregarded without untoward result of any degree.

As a general index, it may be noted that the smallest module size contemplated for general use will mount conduits from approximately 0.125 inch diameter and up to approximately 1.000 inch outside diameter, even when the latter size is to be supported in resilient mounting bushings 35a and 35b as indicated in FIG. 2. The next larger module size will likely be of the relative size indicated by the lower tier of FIG. 1 and is generally contemplated to support tubes of from + or − 0.250 inch diameter to 2.000 inch diameter. Again, the latter size is acceptable even when vibration damping bushings are fitted. The lower portion of FIG. 2 indicates a typical configuration.

Proportionately, all of the contemplated module sizes will be almost invariably similar except for the factor of larger capacity. As the sizes increase, the module width, length, height and thickness increases in linear progression. Referring again to FIG. 1, the upper tier shows, as previously stated, the smallest module presently contemplated. Of special significance in the invention is the concept of using a "standard" length of, for example, 2.000 inch for the overall dimension of the smallest module (length). The next size, as shown in the lower tier of FIG. 1 would then have an overall length of 4.000 inch. The next larger module would be 8.000 inch long, etc. However, the progression being generally in increments of 2.000 inch, it is felt that in special cases, a module of 6.000 inch length or other multiple of 2.000 inch could, as well, be provided. While this principle is outlined in general terms above, it is, of course, possible that another basic increment might later be thought more suitable. Therefore, the outline given is for illustration only and subject to modification.

Generally speaking, and except in those instances where conduit and tube supports are installed in spot locations or to serve a new or random condition or emergency, the design and planning stages for the numerous conduit sizes, types and positioning, in relation to the total installation, are very carefully thought out and detailed. As a rule, especially in complicated systems, a large number of changes, reroutings, alterations in sizes, etc., will be made before a final and fixed design is authorized to be built. In view of this, the number and sizes of modules required, their exact spacing, location and other factors of final assembly will be specified in the minutest detail. Consequently, as will be observed in in FIG. 1 by way of example, the smaller upper modules 10a and 11a are exactly coextensive in length with the lower modules 10 and 11 and are held in corresponding upper and lower alignment rails 30a and 31a, respectively. In designs of this kind, the said modules 10 and 11 (during their fabrication) would be supplied with medially disposed, cylindrical openings 17 of exact (shaved) configuration, designed to receive the close fitting nut means 25 which ties in the center conjunction between the upper small modules 10a and 11a. Inasmuch as airtight assembly is not necessary, and also to not impede rapidity of assembly, the larger lower module components 10 and 11 are all processed alike in their fabrication stage, as noted by the centrally disposed lower opening shown in the lower module 11 in FIG. 1. Of course, if it is known beforehand that either the upper or lower tiers of modules will seldom, if ever, individually or plurally require servicing or replacement, then it may be elected to install continuous alignment rails, top and bottom, in all module layers, with resulting savings in both materials and labor, however unlikely this may be in the average run of cases.

Of course, it is understood that numerous details, considered more or less unnecessary in the drawings, are well known to those skilled in the art involved with conduit and tube supports. For example, it is well realized that no tubes or carriers are available in infinite lengths, and these need to be joined at many points, either by tube fittings, flanged fittings, valve fittings, etc., threaded, bolted or welded. It is obvious that such joining will be designed to occur at convenient locations (for maximum accessibility) and always at points between conduit support positions. Likewise, in many instances, conduits may be diverted right or left, up or down from whatever position occupied in the last support module, in which case they may be further supported, in new directions, terminate in equipment connections or whatever. Thus, it is obvious that modules of almost innumerable variety and configuration, as are more easily provided for by this invention, will undoubtedly be of much value in meeting the complexities involved, in contrast to the rather fixed and set equipment of this kind which is presently purveyed.

Also in FIG. 2, which shows the tiered arrangement of the adaptable modular tubular support, a running length of small conduit 40 is positioned in molded conductive silicone bushings 35a and 35b which are held between the yoke of the module and the conduit 40.

Figure 3:
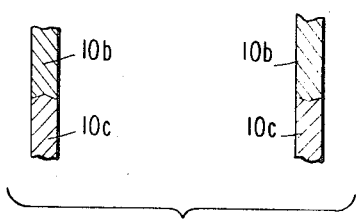
FIG. 3 is a cross-sectional view of an alternate form of sidewall extremities for added interlock under compression between abutting supports.

FIG. 3 discloses an alternate, modified embodiment of complementally formed termini in the sidewalls of the channel-shaped raw stock of the fabrication of modules such as 10b and 10c, with one wall ending in a male configuration and the other female. This would normally be based upon extruded stock, and would provide increased resistance to lateral forces and also assist in the rapid assembly of modules. By vertical rotation, any given module so modified would conjoin with its complementary half.

Whether the adaptable modular conduit support is of singular level, as shown in FIG. 4, or in plural level, as shown in FIG. 1, U-shaped channel filler or terminating pieces, such as 16 and 16a, will normally be positioned at opposite ends of the tube carriers as indicated to provide a neat and workmanlike appearance and finish to the assembly, together with proper purchase for the through bolt 18.

What I claim is:

1. In a tube clamp for an array of pipe members, the combination comprising: pairs of superposable, complemental first channel-shaped modules each having at least one pair of diametrically opposed pipe straddling yoke portions and integrated bottom walls, said bottom walls being perforated at predetermined spaced intervals with at least a pair of said perforations being complemental to those of an adjacent module, plural perforated means secured to diametrically opposed bottom walls of said first channel-shaped modules, and means to fasten a series of said last-named modules in abutting relation and extending through said complemental perforations and the perforations of said perforated means.

2. In a tube clamp for an array of pipe members according to claim 1, wherein at least one of the means secured to said first channel-shaped modules is provided with means to secure an adjacent tier of secondary pipe clamping means thereto to support an adjacent tier of similarly constructed pipe clamping sections.

3. In a tube clamp for an array of pipe members according to claim 1, wherein the pipe straddling yoke portions are provided with resilient means to support said pipe members.

4. In a tube clamp for an array of pipe members according to claim 1, wherein the first channel-shaped modules are provided with portions having means forming an interlock between contacting surfaces thereof.

5. In a tube clamp for an array of pipe members according to claim 2, wherein the means to fasten said modules in pipe engaging relation is arranged to extend normal to the array of pipes fastened in assembled relation.

6. In a tube clamp for an array of pipe members as claimed in claim 3, wherein said resilient means are impregnated with low resistance particles.

7. In a tube clamp for an array of pipe members as claimed in claim 3, wherein said resilient means consists of highly conductive impregnated rubber.

8. In a tube clamp for an array of pipe members as claimed in claim 3, wherein said resilient means consists of highly resilient fluorosilicone rubber.